United States Patent
Chen et al.

(10) Patent No.: US 12,025,238 B2
(45) Date of Patent: Jul. 2, 2024

(54) HYDRAULIC TRIGGER FOR ISOLATION VALVES

(71) Applicant: Schlumberger Technology Corporation, Sugar Land, TX (US)

(72) Inventors: Bo Chen, Houston, TX (US); Brian Walther, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 171 days.

(21) Appl. No.: 17/760,114

(22) PCT Filed: Feb. 17, 2021

(86) PCT No.: PCT/US2021/018278
§ 371 (c)(1),
(2) Date: Aug. 4, 2022

(87) PCT Pub. No.: WO2021/167917
PCT Pub. Date: Aug. 26, 2021

(65) Prior Publication Data
US 2023/0041944 A1 Feb. 9, 2023

Related U.S. Application Data

(60) Provisional application No. 62/978,085, filed on Feb. 18, 2020.

(51) Int. Cl.
*F16K 31/163* (2006.01)
*E21B 21/10* (2006.01)
(Continued)

(52) U.S. Cl.
CPC ............ *F16K 31/163* (2013.01); *E21B 21/10* (2013.01); *E21B 23/004* (2013.01); *E21B 34/10* (2013.01);
(Continued)

(58) Field of Classification Search
CPC ...... F16K 31/122; F16K 31/163; F16K 17/04; E21B 21/10; E21B 23/004; E21B 34/10;
(Continued)

(56) References Cited

U.S. PATENT DOCUMENTS 3,964,544 A 6/1976 Farley et al.
3,976,136 A 8/1976 Farley et al.
(Continued)

FOREIGN PATENT DOCUMENTS

CN 108643854 A 10/2018
GB 2346401 A 8/2000
(Continued)

OTHER PUBLICATIONS

International Search Report and Written Opinion issued in PCT Application PCT/US2021/018278, dated Jun. 3, 2021 (9 pages).
Combined Search and Examination Report issued in GB2102204.1, dated Aug. 18, 2021 (6 pages).
International Search Report and Written Opinion issued in PCT Application PCT/US2021/027951, dated Aug. 3, 2021 (10 pages).

*Primary Examiner* — William M McCalister
(74) *Attorney, Agent, or Firm* — Jeffrey D. Frantz

(57) ABSTRACT

A core rod has internal and external profiles disposed in a housing assembly. A power spring in cooperation with the core rod within the housing assembly is connected to a power spring stopper that is fixed to the housing assembly with at least one shear screw. An inner axial cycling piston bar includes an external profile for mating engagement with the internal profile of the core rod. The inner axial cycling piston bar is connected to a piston in cooperation with a cycling spring, and the piston is configured to move in an upward direction. When a downward force exerted by the cycling spring exceeds the upwardly applied cycling force, the piston, the inner axial cycling piston bar, and the external profile move in a downward direction, thereby causing the
(Continued)

core rod to move an incremental distance in the downward direction, which compresses the power spring by the incremental distance.

20 Claims, 2 Drawing Sheets

(51) Int. Cl.
    *E21B 23/00*         (2006.01)
    *E21B 34/10*         (2006.01)
    *E21B 34/14*         (2006.01)
    *F15B 15/06*         (2006.01)
    *F16K 17/04*         (2006.01)
    *F16K 31/122*       (2006.01)

(52) U.S. Cl.
    CPC ............ *E21B 34/103* (2013.01); *E21B 34/14* (2013.01); *F15B 15/06* (2013.01); *F16K 31/122* (2013.01); *F16K 17/04* (2013.01)

(58) Field of Classification Search
    CPC ...... E21B 34/103; E21B 34/14; E21B 23/006; F15B 15/06; F15B 15/20
    USPC .......................................................... 251/58
    See application file for complete search history.

(56) References Cited

U.S. PATENT DOCUMENTS

| | | | |
|---|---|---|---|
| 4,109,725 A | 8/1978 | Williamson et al. | |
| 4,444,268 A | 4/1984 | Barrington | |
| 4,667,743 A * | 5/1987 | Ringgenberg | E21B 34/108 166/324 |
| 5,029,646 A * | 7/1991 | Blizzard, Jr. | E21B 34/08 166/319 |
| 5,180,007 A * | 1/1993 | Manke | E21B 49/087 166/324 |
| 5,188,183 A | 2/1993 | Hopmann et al. | |
| 5,518,073 A * | 5/1996 | Manke | E21B 34/108 166/321 |
| 5,765,641 A * | 6/1998 | Shy | E21B 23/006 166/292 |
| 5,810,087 A | 9/1998 | Patel | |
| 5,924,696 A | 7/1999 | Frazier | |
| 6,041,864 A | 3/2000 | Patel et al. | |
| 6,085,845 A | 7/2000 | Patel et al. | |
| 6,227,298 B1 | 5/2001 | Patel | |
| 6,230,807 B1 | 5/2001 | Patel | |
| 6,230,808 B1 | 5/2001 | French et al. | |
| 6,244,351 B1 | 6/2001 | Patel et al. | |
| 6,250,383 B1 | 6/2001 | Patel | |
| 6,253,857 B1 | 7/2001 | Gano | |
| 6,289,999 B1 * | 9/2001 | Dewey | E21B 34/10 175/232 |
| 6,302,208 B1 | 10/2001 | Walker et al. | |
| 6,302,216 B1 | 10/2001 | Patel | |
| 6,354,378 B1 | 3/2002 | Patel | |
| 6,397,949 B1 * | 6/2002 | Walker | E21B 34/102 166/334.1 |
| 6,439,306 B1 | 8/2002 | Patel | |
| 6,494,269 B2 | 12/2002 | French et al. | |
| 6,505,684 B2 | 1/2003 | Rayssiguier et al. | |
| 6,523,613 B2 | 2/2003 | Rayssiguier et al. | |
| 6,595,296 B1 * | 7/2003 | French | E21B 34/10 166/321 |
| 6,631,768 B2 | 10/2003 | Patel et al. | |
| 6,634,429 B2 | 10/2003 | Henderson et al. | |
| 6,662,877 B2 | 12/2003 | Patel | |
| 6,691,785 B2 | 2/2004 | Patel | |
| 6,722,440 B2 * | 4/2004 | Turner | E21B 34/102 166/334.1 |
| 6,945,331 B2 | 9/2005 | Patel | |
| 7,198,109 B2 * | 4/2007 | Turner | E21B 43/14 166/334.1 |
| 7,252,152 B2 | 8/2007 | LoGiudice et al. | |
| 7,303,020 B2 * | 12/2007 | Bishop | E21B 23/04 166/324 |
| 7,337,850 B2 | 3/2008 | Contant | |
| 7,347,272 B2 | 3/2008 | Patel et al. | |
| 7,503,398 B2 | 3/2009 | LoGiudice et al. | |
| 7,510,001 B2 | 3/2009 | Spring et al. | |
| 7,617,875 B2 | 11/2009 | Darnell et al. | |
| 7,980,316 B2 | 7/2011 | Swenson et al. | |
| 8,056,643 B2 | 11/2011 | Basmajian et al. | |
| 8,113,286 B2 | 2/2012 | Beall et al. | |
| 8,256,518 B2 | 9/2012 | Guven et al. | |
| 8,261,817 B2 | 9/2012 | Hayter et al. | |
| 8,286,717 B2 | 10/2012 | Giroux et al. | |
| 8,365,832 B2 | 2/2013 | Martin et al. | |
| 8,403,042 B2 | 3/2013 | Green et al. | |
| 8,469,106 B2 | 6/2013 | Caminari et al. | |
| 8,528,641 B2 | 9/2013 | Clem et al. | |
| 8,567,515 B2 | 10/2013 | Giroux et al. | |
| 8,602,105 B2 | 12/2013 | Sinclair | |
| 8,684,099 B2 | 4/2014 | Azimi et al. | |
| 8,776,890 B2 | 7/2014 | Basmajian et al. | |
| 8,783,343 B2 | 7/2014 | Giroux et al. | |
| 8,863,853 B1 | 10/2014 | Harris et al. | |
| 8,870,153 B2 | 10/2014 | Ross | |
| 8,893,798 B2 | 11/2014 | Hayter et al. | |
| 8,978,750 B2 | 3/2015 | Noske et al. | |
| 9,068,417 B2 | 6/2015 | Swenson et al. | |
| 9,133,692 B2 | 9/2015 | Edwards | |
| 9,163,481 B2 | 10/2015 | Noske et al. | |
| 9,175,552 B2 | 11/2015 | Kitzman | |
| 9,222,335 B2 | 12/2015 | Caminari et al. | |
| 9,309,745 B2 | 4/2016 | Patel | |
| 9,353,600 B2 | 5/2016 | Cong et al. | |
| 9,410,401 B2 | 8/2016 | Cox et al. | |
| 9,453,380 B2 | 9/2016 | Hardin, Jr. et al. | |
| 9,458,698 B2 | 10/2016 | Harris et al. | |
| 9,482,076 B2 | 11/2016 | Patel | |
| 9,518,439 B2 | 12/2016 | Hallundbæk et al. | |
| 9,518,445 B2 | 12/2016 | Noske | |
| 9,624,753 B2 | 4/2017 | Stinessen et al. | |
| 9,810,343 B2 | 11/2017 | Miller et al. | |
| 9,869,153 B2 | 1/2018 | Moreno et al. | |
| 10,036,231 B2 | 7/2018 | Murdoch | |
| 10,132,137 B2 | 11/2018 | McDowell et al. | |
| 10,138,710 B2 | 11/2018 | Noske | |
| 10,151,171 B2 | 12/2018 | Noske et al. | |
| 10,208,568 B2 | 2/2019 | Hill et al. | |
| 10,214,999 B2 | 2/2019 | Noske et al. | |
| 10,233,725 B2 | 3/2019 | Provost | |
| 10,273,767 B2 | 4/2019 | Noske | |
| 10,352,131 B2 | 7/2019 | Dockweiler | |
| 10,422,202 B2 | 9/2019 | Kellner et al. | |
| 10,472,929 B2 | 11/2019 | Miller et al. | |
| 10,502,024 B2 | 12/2019 | Wang et al. | |
| 10,533,399 B2 | 1/2020 | Ceccon De Azevedo et al. | |
| 10,550,667 B2 | 2/2020 | Rushing et al. | |
| 10,605,047 B2 | 3/2020 | Patel | |
| 10,697,270 B2 | 6/2020 | Lundheim et al. | |
| 10,704,363 B2 | 7/2020 | Johnson et al. | |
| 10,738,570 B2 | 8/2020 | Miller et al. | |
| 10,781,665 B2 | 9/2020 | Murdoch | |
| 10,890,048 B2 | 1/2021 | Noske et al. | |
| 10,895,130 B2 | 1/2021 | Noske et al. | |
| 10,947,798 B2 | 3/2021 | Noske | |
| 10,954,749 B2 | 3/2021 | Noske | |
| 11,111,759 B2 | 9/2021 | Mudigere et al. | |
| 11,293,265 B2 | 4/2022 | Burris et al. | |
| 11,346,183 B2 | 5/2022 | Mair et al. | |
| 2008/0001111 A1 * | 1/2008 | Ross | E21B 34/102 166/332.1 |
| 2009/0008102 A1 * | 1/2009 | Anderson | E21B 34/10 166/373 |
| 2009/0229828 A1 * | 9/2009 | Ross | E21B 43/04 166/373 |
| 2009/0294124 A1 | 12/2009 | Patel | |
| 2011/0032798 A1 | 2/2011 | Ray et al. | |

(56) References Cited

U.S. PATENT DOCUMENTS

| | | |
|---|---|---|
| 2011/0056679 A1 | 3/2011 | Rytlewski |
| 2011/0168403 A1 | 7/2011 | Patel |
| 2012/0018170 A1 | 1/2012 | Basmajian et al. |
| 2012/0042966 A1 | 2/2012 | Ross |
| 2012/0285702 A1 | 11/2012 | Rytlewski |
| 2015/0233208 A1 | 8/2015 | Muscroft et al. |
| 2017/0022783 A1 | 1/2017 | Yong et al. |
| 2018/0163508 A1 | 6/2018 | Schubert |
| 2019/0128099 A1 | 5/2019 | Woulwijk |
| 2020/0115992 A1 | 4/2020 | Wang et al. |
| 2020/0141211 A1 | 5/2020 | Franklin et al. |
| 2020/0270966 A1 | 8/2020 | Moyes et al. |
| 2020/0291749 A1 | 9/2020 | Johnson et al. |
| 2021/0040816 A1 | 2/2021 | Hiorth et al. |
| 2021/0381326 A1 | 12/2021 | Inglis et al. |
| 2022/0170343 A1 | 6/2022 | Brodie et al. |

FOREIGN PATENT DOCUMENTS

| | | |
|---|---|---|
| GB | 2541943 A | 3/2017 |
| JP | 2001299951 A | 10/2001 |
| WO | 2009098498 A1 | 8/2009 |
| WO | 2014149049 A1 | 9/2014 |
| WO | 2016207863 A1 | 12/2016 |
| WO | 2017027243 A1 | 2/2017 |
| WO | 2020068466 A1 | 4/2020 |
| WO | 2020219435 A1 | 10/2020 |
| WO | 2020231415 A1 | 11/2020 |
| WO | 2021212103 A1 | 10/2021 |
| WO | 2022204284 A1 | 9/2022 |

* cited by examiner

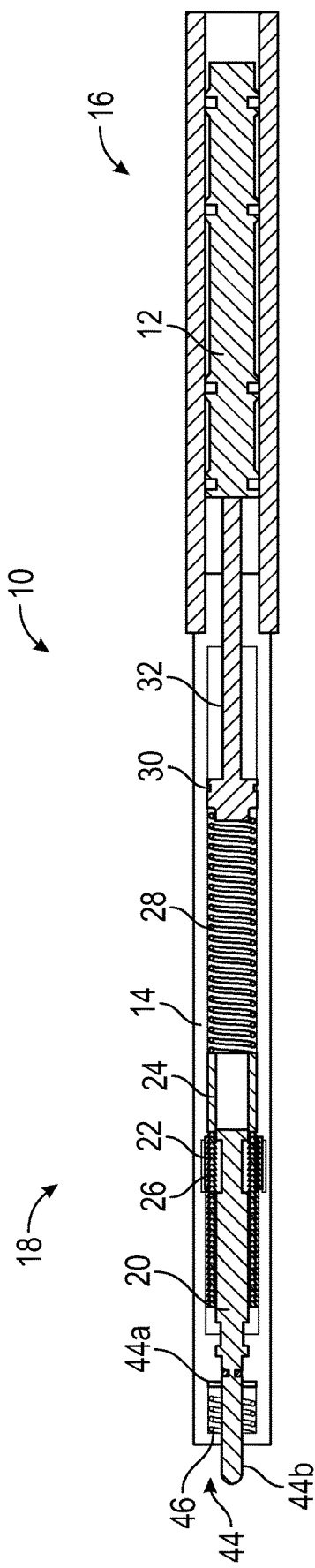
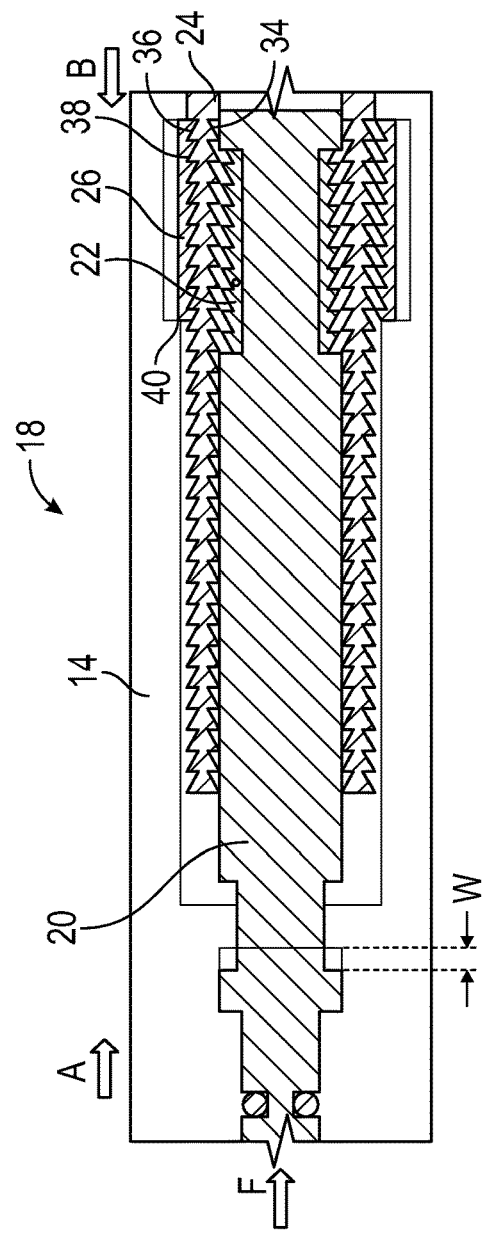
FIG. 1
FIG. 2

HYDRAULIC TRIGGER FOR ISOLATION VALVES

CROSS-REFERENCE TO RELATED APPLICATION

The present document is the National Stage Entry of International Application No. PCT/US2021/018278, filed Feb. 17, 2021, which is based on and claims priority to U.S. Provisional Application No. 62/978,085, filed Feb. 18, 2020, which is incorporated herein by reference in its entirety.

BACKGROUND

An isolation valve is a device that provides isolation to a reservoir. A traditional application of an isolation valve is to protect the reservoir from damaging fluid during transition from completion to production. An isolation valve may include at least a trigger section and an actuator to remotely change the state of the isolation valve.

SUMMARY

A system according to one or more embodiments of the present disclosure includes a housing assembly; a core rod disposed in the housing assembly, the core rod including an internal profile and an external profile; a power spring in cooperation with the core rod within the housing assembly, the power spring connected to a power spring stopper that is fixed to the housing assembly with at least one shear screw; an inner axial cycling piston bar including an external profile for mating engagement with the internal profile of the core rod; and a piston including a piston head, the piston being in cooperation with a cycling spring, and the piston being connected at an end of the inner axial cycling piston bar. In one or more embodiments of the present disclosure, the piston is configured to move in an upward direction as the cycling spring exerts a downward force on the piston head of the piston upon application of a cycling force in the upward direction. In one or more embodiments of the present disclosure, the piston head is configured to move in a downward direction as the downward force exerted by the cycling spring exceeds the upwardly applied cycling force, and the inner axial cycling piston bar connected to the piston is configured to move in the downward direction upon relaxation of the cycling force. According to one or more embodiments of the present disclosure, movement of the inner axial cycling piston bar in the downward direction also moves the external profile of the inner axial cycling piston bar in the downward direction, thereby causing the core rod to move an incremental distance in the downward direction, which compresses the power spring by the incremental distance.

A method according to one or more embodiments of the present disclosure includes applying a cycling force to a piston in an upward direction, wherein the piston includes a piston head and is in cooperation with a cycling spring, and wherein the applying step causes the piston to move in the upward direction as the cycling spring exerts a downward force on the piston head of the piston. In one or more embodiments of the present disclosure, the method further includes relaxing the cycling force, causing the piston head to move in a downward direction as the downward force exerted by the cycling spring exceeds the upwardly applied cycling force, and an inner axial cycling piston bar connected to the piston to move in the downward direction. According to one or more embodiments of the present disclosure, the inner axial cycling piston bar includes an external profile for mating engagement with an internal profile of a core rod disposed in a housing assembly, and wherein as the inner axial cycling piston bar moves in the downward direction, the external profile of the inner axial cycling piston bar moves an incremental distance in the downward direction, thereby causing the core rod to move the incremental distance in the downward direction. The method according to one or more embodiments of the present disclosure further includes compressing a power spring in cooperation with the core rod within the housing assembly by the incremental distance, the power spring being connected to a power spring stopper that is fixed to the housing assembly with at least one shear screw; moving the inner axial cycling piston bar and the external profile of the inner axial cycling piston bar in the upward direction when the cycling force changes to the upward direction, thereby causing the external profile of the inner axial cycling piston bar to collapse, disengage from the internal profile of the core rod, and skip to re-engage the internal profile of the core rod at a location measuring the incremental distance away; preventing the core rod from moving in the upward direction; repeating the applying, compressing, moving, and preventing steps until a compression force of the power spring causes the at least one shear screw to shear, thereby releasing the power spring stopper; and pushing the power spring stopper in the downward direction to actuate a hydraulic valve from a first position to a second position However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 1 shows a hydraulic trigger system for actuating a hydraulic valve according to one or more embodiments of the present disclosure;

FIG. 2 shows a portion of a ratchet assembly of a hydraulic trigger system for actuating a hydraulic valve according to one or more embodiments of the present disclosure.

DETAILED DESCRIPTION

Figure 3:
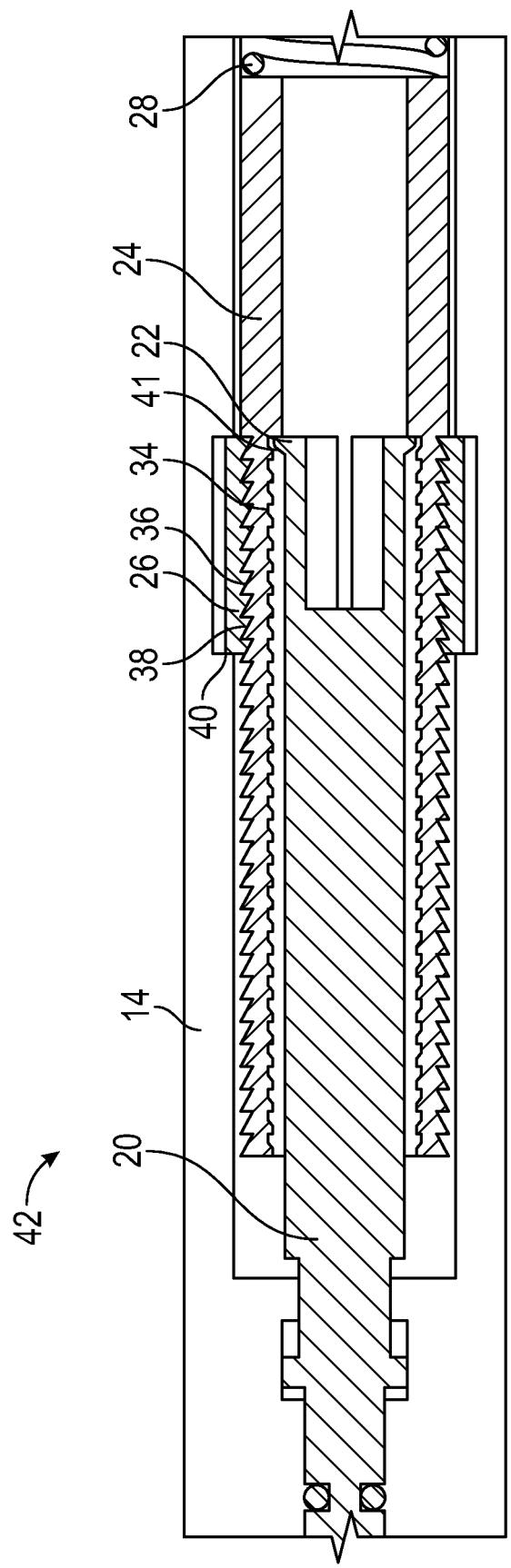
FIG. 3 shows a portion of a collet assembly of a hydraulic trigger system for actuating a hydraulic valve according to one or more embodiments of the present disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims: the terms "up" and "down," "upper" and "lower," "upwardly" and "downwardly," "upstream" and "downstream," "uphole" and "downhole," "above" and "below," "top" and "bottom," and other like terms indicating relative positions above or below a given point or element are used in this description to more clearly describe some embodiments of the disclosure.

The present disclosure generally relates to a system and method for actuating a hydraulic valve. More specifically, the present disclosure relates to a hydraulic trigger and an associated method for actuating an isolation valve. In the system and method according to one or more embodiments of the present disclosure, ratchet teeth or a collet mechanism of the hydraulic trigger may be used as a counting system to ensure that the isolation valve changes states only when a demanded count is reached.

Referring now to FIG. 1, a hydraulic trigger system 10 for actuating a hydraulic valve 12 according to one or more embodiments of the present disclosure is shown. As shown, the hydraulic trigger system 10 includes a housing assembly 14, which connects with a hydraulic valve assembly 16 of the hydraulic valve 12 according to one or more embodiments of the present disclosure. As further shown in FIG. 1, the hydraulic trigger system 10 may include a ratchet assembly 18 disposed in the housing assembly 14. As further described below, the ratchet assembly 18 may include an inner axial cycling piston bar 20 having an external profile 22, a core rod 24, an outer ring 26, a power spring 28, at least one shear screw 30, and a power spring stopper 32 according to one or more embodiments of the present disclosure. FIG. 2 shows a portion of the ratchet assembly 18 of the hydraulic trigger system 10 according to one or more embodiments of the present disclosure in more specific detail. As further described below, the ratchet assembly 18 according to one or more embodiments of the present disclosure functions as an indexing mechanism.

Referring now to FIGS. 1 and 2, the core rod 24 of the ratchet assembly 18 is disposed in the housing assembly 14. According to one or more embodiments of the present disclosure, the core rod 24 includes an internal profile 34 and an external profile 36. As previously mentioned, the ratchet assembly 18 may include an inner axial cycling piston bar 20 having an external profile 22 according to one or more embodiments of the present disclosure. In one or more embodiments, the external profile 22 of the inner axial cycling piston bar 20 may matingly engage with the internal profile 34 of the core rod 24. Further, in one or more embodiments of the present disclosure, the external profile 22 may be integral with the inner axial cycling piston bar 20, or the external profile 22 may be a separate component affixed to the inner axial cycling piston bar 20. In view of FIG. 1, the power spring 28 of the ratchet assembly 18 according to one or more embodiments of the present disclosure cooperates with the core rod 24 within the housing assembly 14. As further shown in FIG. 1, the power spring 28 is connected to a power spring stopper 32 that is fixed to the housing assembly 14 with at least one shear screw 30 according to one or more embodiments of the present disclosure.

Still referring to FIGS. 1 and 2, operation of the ratchet assembly 18 of the hydraulic trigger system 10 for actuating the hydraulic valve 12 according to one or more embodiments of the present disclosure will now be described. Upon application of a cycling force F on one end of the inner axial cycling piston bar 20 in a downward direction A, the inner axial cycling piston bar 20 moves in downward direction A by incremental distance W. According to one or more embodiments of the present disclosure, the cycling force F may result from differential pressure cycles from the surface, for example, or any other type of cycling force. Further, in one or more embodiments of the present disclosure, incremental distance W is equal to a length of the stroke of the inner axial cycling piston bar 20, and this incremental distance W may be constructed into housing assembly 14 of the hydraulic trigger system 10, as shown in FIG. 2, for example. Moreover, in one or more embodiments of the present disclosure, the incremental distance W may be equal to a given number of ratchet thread widths on the internal profile 34 of the core rod 24. The incremental distance W, the number of ratchet teeth on the internal profile 34 of the core rod 24, and the number of ratchet teeth on the external profile 22 of the inner axial cycling piston bar 20 are not limiting and depend on the application for which one or more embodiments of the present disclosure are being used.

In one or more embodiments of the present disclosure, movement of the inner axial cycling piston bar 20 in downward direction A by incremental distance W also moves the external profile 22 of the inner axial cycling piston bar 20 in downward direction A by incremental distance W. Because the external profile 22 of the inner axial cycling piston bar 20 is in mating engagement with the internal profile 34 of the core rod 24 in accordance with one or more embodiments of the present disclosure, movement of the external profile 22 of the inner axial cycling piston bar 20 in downward direction A by incremental distance W also causes the core rod 24 to move in downward direction A by incremental distance W. Because the core rod 24 is in cooperation with the power spring 28 within the housing assembly 14 as previously described, and as shown in FIG. 1, this movement of the core rod 24 in downward direction A by incremental distance W compresses the power spring 28 by incremental distance W. Notably, because the power spring stopper 32 of the ratchet assembly 18 is fixed to the housing assembly 14 with at least one shear screw 30, the power spring stopper 32 prevents translation of the power spring 28 within the housing assembly 14 in downward direction A. That is, because of the power spring stopper 32, the power spring 28 is forced to compress by incremental distance W (instead of translating in downward direction A by incremental distance W) as long as the compression force of the power spring 28 is less than a shear force of the at least one shear screw 30.

Still referring to FIGS. 1 and 2, the ratchet assembly 18 of the hydraulic trigger system 10 according to one or more embodiments of the present disclosure may include an outer ring 26 having an internal profile 38 that engages with the external profile 36 of the core rod 24. In one or more embodiments of the present disclosure, the internal profile 38 of the outer ring 26 and the external profile 36 of the core rod 24 may each include ratchet teeth, which facilitates the engagement of internal profile 38 of the outer ring 26 with the external profile 36 of the core rod 24. However, embodiments of the present disclosure are not limited to this shape for the internal profile 38 and the external profile 36, and other profile patterns are within the scope of the present disclosure. Further, as shown in FIG. 2, the outer ring 26 of the ratchet assembly 18 may abut a stop 40 in the housing assembly 14 according to one or more embodiments of the present disclosure, for example.

Returning to the operation of the ratchet assembly 18 of the hydraulic trigger system 10 for actuating the hydraulic valve 12 according to one or more embodiments of the present disclosure, as pressure bleeds off, cycling force F changes to upward direction B, which opposes downward direction A. When the cycling force F changes to upward direction B, the inner axial cycling piston bar 20 moves in upward direction B. In one or more embodiments of the present disclosure, movement of the inner axial cycling piston bar 20 in upward direction B also moves the external profile 22 of the inner axial cycling piston bar 20 in upward direction B, which causes the external profile 22 of the inner axial cycling piston bar 20 to collapse, disengage from the internal profile 34 of the core rod 24, and skip to re-engage the internal profile 34 of the core rod 24 at a location measuring the incremental distance W away. Because the outer ring 26 of the ratchet assembly 18 has an internal profile 38 that engages with the external profile of the core rod 24, and because the outer ring 26 may abut a stop 40 in the housing assembly 14 according to one or more embodiments of the present disclosure, the outer ring 26 prevents the core rod 24 from moving in upward direction B.

Thereafter, the previously described operational steps of the ratchet assembly 18 are repeated until the compression force of the power spring 28 causes the at least one shear screw 30 to shear, thereby releasing the power spring stopper 32. That is, each cycle will compress the power spring 28 by incremental distance W, and the compression force of the power spring 28 will continue to increase until the shear value of the at least one shear screw 30 is reached. The shear value of the at least one shear screw 30 is not limiting and depends on the application for which one or more embodiments of the present disclosure is being used. In one or more embodiments of the present disclosure, release of the power spring stopper 32 pushes the power spring stopper 32 in downward direction A, which actuates the hydraulic valve 12 of the hydraulic valve assembly 16 from a first position to a second position. According to one or more embodiments of the present disclosure, the hydraulic valve 12 may be a sleeve valve, a ball valve, an isolation valve, or a sliding sleeve, for example. In one or more embodiments of the present disclosure, actuating the hydraulic valve 12 from the first position to the second position changes a flow direction of the hydraulic valve 12. In one or more embodiments, actuating the hydraulic valve 12 from the first position to the second position opens the hydraulic valve 12. In other embodiments, actuating the hydraulic valve 12 from the first position to the second position closes the hydraulic valve 12.

As previously described, the ratchet assembly 18 or indexing mechanism according to one or more embodiments of the present disclosure may transition through a sequence of positions in response to the cycling of the cycling force F. Referring back to FIG. 1, in one or more embodiments of the present disclosure, a piston 44 having a piston head 44(a) and a piston rod 44(b) in cooperation with a cycling spring 46 may be connected at the end of the inner axial cycling piston bar 20 to which the cycling force F is applied. In such embodiments, the cycling spring 46, which may be a mechanical or coiled spring, resists an upward force applied to the piston 44, which is connected to the inner axial cycling piston bar 20 of the ratchet assembly 18 or indexing mechanism, for example.

In sum, in embodiments of the present disclosure where the piston 44 and the cycling spring 46 are connected to the inner axial cycling piston bar 20, as previously described, the cycling force F, which may be well pressure, differential pressure, or any other cycling pressure or force, for example, may be cycled up and downhole to correspondingly move the piston head 44(a). The movement of the piston head 44(a) may cycle the ratchet assembly 18 or indexing mechanism through a predetermined sequence of positions. For example, when the cycling force F increases to exert a upward force on the piston 44 including the piston head 44(a), the piston head 44(a) moves upwardly, and the cycling spring 46 resists the upwardly applied cycling force by exerting a downward force and resisting compression. When the cycling force F is relaxed so that the downward force generated by the cycling spring 46 exceeds the upward force that is exerted by the well pressure, the piston head 44(a) moves downwardly. In accordance with one or more embodiments of the present disclosure, each up and down cycle of the piston head 44(a) may cause the ratchet assembly 18 or indexing mechanism to transition to the next position in the sequence, as previously described.

Further, in embodiments of the present disclosure where the piston 44 and the cycling spring 46 are connected to the inner axial cycling piston bar 20, as previously described, the piston rod 44(b) of the piston 44 may extend beyond the housing assembly 14, as shown in FIG. 4, for example. In such embodiments of the present disclosure, a bellow or other cover may be used to protect the portion of the piston rod 44(b) that extends beyond housing assembly 14. In this way, the bellow or other cover may protect the portion of the piston rod 44(b) that extends beyond the housing assembly 14 from debris or other contaminants.

As shown in FIGS. 1 and 2, the external profile 22 of the inner axial cycling piston bar 20 and the internal profile 34 of the core rod 24 of the ratchet assembly 18 of the hydraulic trigger system 10 may each include ratchet teeth, which facilitates the mating engagement of the external profile 22 with the internal profile 34. However, embodiments of the present disclosure are not limited to this ratchet teeth shape for the external profile 22 of the inner axial cycling piston bar 20 and the internal profile 34 of the core rod 24. Indeed, other profiles are contemplated and are within the scope of the present disclosure.

For example, FIG. 3 shows a portion of a collet assembly 42 of a hydraulic trigger system 10 for actuating a hydraulic valve 12 according to one or more embodiments of the present disclosure. The collet assembly 42 shown in FIG. 3 functions similarly to the ratchet assembly 18 shown in FIGS. 1 and 2, and includes some of the same components of the ratchet assembly 18 as previously described. That is, similarly to the ratchet assembly 18, the collet assembly 42 according to one or more embodiments of the present disclosure functions as an indexing mechanism. As such, the same components are identified in FIG. 3, and they will not be repeated here. As specifically shown in FIG. 3, the external profile 22 of the inner axial cycling piston bar 20 and the internal profile 34 of the core rod 24 of the collet assembly 42 of the hydraulic trigger system 10 may include a collet 41 and a profile for receiving the collet 41, respectively, which facilitates the mating engagement of the external profile 22 with the internal profile 34. However, embodiments of the present disclosure are not limited to this collet shape for the external profile 22 of the inner cycling piston bar 20 and the internal profile 34 of the core rod 24, for example.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system, comprising:
a housing assembly;
a core rod disposed in the housing assembly, the core rod comprising an internal profile and an external profile;
a power spring in cooperation with the core rod within the housing assembly, the power spring connected to a power spring stopper that is fixed to the housing assembly with at least one shear screw;

an inner axial cycling piston bar comprising an external profile for mating engagement with the internal profile of the core rod; and a piston comprising a piston head, the piston being in cooperation with a cycling spring, and the piston being connected at an end of the inner axial cycling piston bar, wherein, upon application of a cycling force in an upward direction, the piston is configured to move in the upward direction as the cycling spring exerts a downward force on the piston head of the piston, wherein, upon relaxation of the cycling force, the piston head is configured to move in a downward direction as the downward force exerted by the cycling spring exceeds the upwardly applied cycling force, and the inner axial cycling piston bar connected to the piston is configured to move in the downward direction, wherein movement of the inner axial cycling piston bar in the downward direction also moves the external profile of the inner axial cycling piston bar in the downward direction, thereby causing the core rod to move an incremental distance in the downward direction, which compresses the power spring by the incremental distance.

2. The system of claim 1, wherein the external profile for mating engagement with the internal profile of the core rod comprises ratchet teeth.

3. The system of claim 1, wherein the external profile for mating engagement with the internal profile of the core rod comprises a collet.

4. The system of claim 1, further comprising an outer ring comprising an internal profile that engages with the external profile of the core rod, the outer ring abutting a stop of the housing assembly.

5. The system of claim 4,
wherein the inner axial cycling piston bar is configured to move in the upward direction when the cycling force changes to the upward direction, wherein movement of the inner axial cycling piston bar in the upward direction also moves the external profile of the inner axial cycling piston bar in the upward direction, which causes the external profile of the inner axial cycling piston bar to collapse, disengage from the internal profile of the core rod, and skip to re-engage the internal profile of the core rod at a location measuring the incremental distance away, and wherein the outer ring prevents the core rod from moving in the upward direction.

6. The system of claim 5, wherein the external profile for mating engagement with the internal profile of the core rod comprises ratchet teeth.

7. The system of claim 5, wherein the external profile for mating engagement with the internal profile of the core rod comprises a collet.

8. The system of claim 5, further comprising a hydraulic valve,
wherein the power spring is configured to push the power spring stopper in the downward direction when a compression force of the power spring reaches a shear value of the at least one shear screw, causing the at least one shear screw to shear, and wherein pushing the power spring stopper in the downward direction actuates the hydraulic valve from a first position to a second position.

9. The system of claim 8, wherein actuating the hydraulic valve from the first position to the second position changes a flow direction of the hydraulic valve.

10. The system of claim 8, wherein actuating the hydraulic valve from the first position to the second position opens the hydraulic valve.

11. The system of claim 8, wherein actuating the hydraulic valve from the first position to the second position closes the hydraulic valve.

12. The system of claim 8, wherein the hydraulic valve is selected from the group consisting of: a sleeve valve, a ball valve, an isolation valve, and a sliding sleeve.

13. A method comprising:
applying a cycling force to a piston in an upward direction,
wherein the piston comprises a piston head and is in cooperation with a cycling spring, and
wherein the applying step causes the piston to move in the upward direction as the cycling spring exerts a downward force on the piston head of the piston;

relaxing the cycling force, causing the piston head to move in a downward direction as the downward force exerted by the cycling spring exceeds the upwardly applied cycling force, and an inner axial cycling piston bar connected to the piston to move in the downward direction,
wherein the inner axial cycling piston bar comprises an external profile for mating engagement with an internal profile of a core rod disposed in a housing assembly, and
wherein as the inner axial cycling piston bar moves in the downward direction, the external profile of the inner axial cycling piston bar moves an incremental distance in the downward direction, thereby causing the core rod to move the incremental distance in the downward direction;

compressing a power spring in cooperation with the core rod within the housing assembly by the incremental distance, the power spring being connected to a power spring stopper that is fixed to the housing assembly with at least one shear screw;

moving the inner axial cycling piston bar and the external profile of the inner axial cycling piston bar in the upward direction when the cycling force changes to the upward direction, thereby causing the external profile of the inner axial cycling piston bar to collapse, disengage from the internal profile of the core rod, and skip to re-engage the internal profile of the core rod at a location measuring the incremental distance away;

preventing the core rod from moving in the upward direction;

repeating the applying, compressing, moving, and preventing steps until a compression force of the power spring causes the at least one shear screw to shear, thereby releasing the power spring stopper; and pushing the power spring stopper in the downward direction to actuate a hydraulic valve from a first position to a second position.

14. The method of claim 13, wherein the external profile for mating engagement with the internal profile of the core rod comprises ratchet teeth.

15. The method of claim 13, wherein the external profile for mating engagement with the internal profile of the core rod comprises a collet.

16. The method of claim 13, wherein an outer ring comprising an internal profile that engages with an external profile of the core rod prevents the core rod from moving in the upward direction.

17. The method of claim 13, wherein actuating the hydraulic valve from the first position to the second position changes a flow direction of the hydraulic valve.

18. The method of claim 13, wherein actuating the hydraulic valve from the first position to the second position opens the hydraulic valve.

19. The method of claim 13, wherein actuating the hydraulic valve from the first position to the second position closes the hydraulic valve.

20. The method of claim 13, wherein the hydraulic valve is selected from the group consisting of: a sleeve valve, a ball valve, an isolation valve, and a sliding sleeve.

* * * * *